US012710727B2

(12) United States Patent
Farine et al.

(10) Patent No.: US 12,710,727 B2
(45) Date of Patent: Aug. 18, 2026

(54) TIMEPIECE INCLUDING A DISPLAY MEMBER FOR DISPLAYING A LOCAL TIME HT AND A DISPLAY MEMBER FOR DISPLAYING A GMT TIME

(71) Applicant: Manufacture d'Horlogerie Audemars Piguet SA, Le Brassus (CH)

(72) Inventors: Jean-Daniel Farine, La Chaux-du-Milieu (CH); Laurent Calame, La Sagne (CH)

(73) Assignee: MANUFACTURE D'HORLOGERIE AUDEMARS PIGUET SA, Le Brassus (CH)

( * ) Notice: Subject to any disclaimer, the term of this patent is extended or adjusted under 35 U.S.C. 154(b) by 261 days.

(21) Appl. No.: 18/719,190

(22) PCT Filed: Oct. 14, 2022

(86) PCT No.: PCT/EP2022/078745
§ 371 (c)(1),
(2) Date: Jun. 12, 2024

(87) PCT Pub. No.: WO2023/117175
PCT Pub. Date: Jun. 29, 2023

(65) Prior Publication Data

US 2025/0068127 A1 Feb. 27, 2025

(30) Foreign Application Priority Data

Dec. 21, 2021 (EP) .................................... 21216391

(51) Int. Cl.
*G04B 19/22* (2006.01)
*G04B 13/00* (2006.01)

(52) U.S. Cl.
CPC ......... *G04B 19/221* (2013.01); *G04B 13/008* (2013.01)

(58) Field of Classification Search
CPC .... G04B 19/22; G04B 19/226; G04B 19/221; G04B 13/008; G04B 13/00
See application file for complete search history.

(56) References Cited

U.S. PATENT DOCUMENTS

| | | | | |
|---|---|---|---|---|
| 7,483,340 | B2 * | 1/2009 | Dias | G04B 19/235 368/27 |
| 12,366,827 | B2 * | 7/2025 | Leskerpit | G04B 19/02 |
| 2009/0016174 | A1 * | 1/2009 | Schlencker | G04B 27/026 368/220 |

FOREIGN PATENT DOCUMENTS

| | | | |
|---|---|---|---|
| CH | 665930 | A3 | 6/1988 |
| EP | 2663902 | A1 | 11/2013 |

(Continued)

OTHER PUBLICATIONS

EP 3477402 (Year: 2019).*
International Search Report and Written Opinion of the ISA for PCT/EP2022/078745 mailed Jan. 19, 2023, 12 pages.

*Primary Examiner* — Sean Kayes
(74) *Attorney, Agent, or Firm* — NIXON & VANDERHYE

(57) ABSTRACT

A timepiece includes a first member for displaying a local time, a second member for displaying a GMT time, a drive wheel and pinion of the first display member, a first correction mechanism arranged to be able to be kinematically linked to the drive wheel and pinion to allow simultaneous correction of the local time and the GMT time, a second correction mechanism of the second display member, arranged to correct the GMT time independently of the local time, a drive mechanism of the second display member including a differential gear including a first input arranged to be kinematically linked to the drive wheel and pinion of the first display member, a second input arranged to be kinematically linked to the second correction mechanism of (Continued)

the second display member, an output arranged to drive the second display member, and a geartrain mounted in parallel with the drive mechanism.

19 Claims, 6 Drawing Sheets

(56) References Cited

FOREIGN PATENT DOCUMENTS

| | | | |
|---|---|---|---|
| EP | 3252543 | A1 | 12/2017 |
| WO | 2012095198 | A1 | 7/2012 |

* cited by examiner

TIMEPIECE INCLUDING A DISPLAY MEMBER FOR DISPLAYING A LOCAL TIME HT AND A DISPLAY MEMBER FOR DISPLAYING A GMT TIME

CROSS-REREFERENCE TO RELATED APPLICATIONS

This application is the U.S. national phase of International Application No. PCT/EP2022/078745 filed Oct. 14, 2022 which designated the U.S. and claims priority to EP 21216391.9 filed Dec. 21, 2021, the entire contents of each of which are hereby incorporated by reference.

TECHNICAL FIELD

The present invention relates to a timepiece including a motor organ, at least one first display member arranged to display a local time HT, a second display member arranged to be able to display a GMT time of a different time zone from that of the local time HT, a drive wheel and pinion of the first display member arranged to be kinematically linked to the motor organ in a disengageable manner, a first correction mechanism arranged to be able to be kinematically linked to the drive wheel and pinion to allow simultaneous correction of the local time HT and the GMT time, a second correction mechanism of the second display member, distinct from the first correction mechanism, and arranged to be able to correct the GMT time independently of the local time HT, a drive mechanism of the second display member including a differential gear comprising at least one first input arranged to be kinematically linked to the drive wheel and pinion of the first display member, a second input arranged to be kinematically linked to the second correction mechanism of the second display member, and an output arranged to drive said second display member.

PRIOR ART

Such a timepiece is described, for example, in document EP 2663902. In this timepiece, the local time HT and the GMT time are simultaneously corrected by means of the hand-setting stem, that is to say the traditional winding stem, and the GMT time is corrected independently of the local time HT by means of a push-piece. These different corrections are made possible by the use of a differential gear, the output of which is arranged to drive the second GMT time display member. However, using such a differential gear, because of the guides and the gear ratios of its different components, does generate a certain play in the GMT time display geartrain as well as in the GMT time correction geartrain. This play is even more present in the event of bidirectional correction.

For this reason, there is a risk that the member for displaying the GMT time, once corrected, alone or with the HT time, does not reposition itself correctly, and more particularly in the event of bidirectional correction, so that it will no longer be synchronized with the positioning of the member for displaying the HT time, with respect to the minutes.

In addition, in document EP 2663902, provision is made to correct the HT time by rotating the winding stem by keeping the push-piece pressed. The disadvantage of this mechanism is that, once the HT time has been corrected, given that the minute display member moves around at the same time as the member for displaying the HT time, there is a risk that the minute display member does not reposition itself correctly, so that the member for displaying the GMT time will no longer be synchronized with the corrected minute display member.

The present invention aims to remedy these drawbacks by proposing a timepiece which makes it possible to correct the HT time and/or the GMT time with a reduction of play in the geartrains for displaying the GMT time and correcting the GMT time, allowing a correction, which is in particular bidirectional, without the risk of desynchronization of the member for displaying the GMT time.

Another object of the present invention is to propose a timepiece which makes it possible to correct the member for displaying the HT time without the risk of desynchronization of the member for displaying the GMT time.

DISCLOSURE OF THE INVENTION

To this end, the invention relates to a timepiece including a motor organ, at least one first display member arranged to display a local time HT, a second display member arranged to be able to display a GMT time of a different time zone from that of the local time HT, a drive wheel and pinion of the first display member arranged to be kinematically linked to the motor organ in a disengageable manner, a first correction mechanism arranged to be able to be kinematically linked to the drive wheel and pinion of the first display member to allow simultaneous correction of the local time HT and the GMT time, a second correction mechanism of the second display member, distinct from the first correction mechanism, and arranged to be able to correct the GMT time independently of the local time HT, a drive mechanism of the second display member including a differential gear comprising at least one first input arranged to be kinematically linked to the drive wheel and pinion of the first display member, a second input arranged to be kinematically linked to the second correction mechanism of the second display member, and an output arranged to drive said second display member.

According to the invention, said timepiece includes a geartrain mounted in parallel with the drive mechanism of the second display member and arranged to be kinematically linked to the drive wheel and pinion of the first display member and to be kinematically linked to the output of the differential gear in a disengageable manner by means of a first star linked to said geartrain mounted in parallel and of a first jumper connected to the output of the differential gear and cooperating with said first star such that said output is driven by said geartrain mounted in parallel during a simultaneous correction of the local time HT and the GMT time by the first correction mechanism and such that said output is uncoupled from said geartrain mounted in parallel during a correction of the GMT time independently of the local time HT by the second correction mechanism while allowing, after correction, a repositioning of the second display member synchronized with the positioning of the first display member.

The geartrain which is mounted in parallel and connected to the output on the output of the differential gear by means of a star/jumper system advantageously makes it possible to reduce the play in the geartrains for displaying the GMT time and for correcting the GMT time and to guarantee a correct repositioning of the member for displaying the GMT time after correction. Thus, the positioning of the member for displaying the GMT time remains permanently synchronized with the positioning of the member for displaying the HT time, with respect to the minutes, even after a simultaneous correction of the local time HT and the GMT time or a correction of the GMT time alone.

The timepiece advantageously includes a third local time HT correction mechanism which is distinct from the first and second correction mechanisms and arranged to be able to cooperate with the first local time HT display member in order to be able to solely drive said first local time HT display member, step by step, during a correction of the local time HT. There is therefore no risk of desynchronization of the first local time HT display member of the minute display member during a correction of the local time HT.

Thus, the positioning of the GMT time display member remains synchronized with the positioning of the local time HT and minute display member, even after a correction of the local time HT alone, the minutes remaining fixed during this correction.

BRIEF DESCRIPTION OF THE DRAWINGS

Other characteristics and advantages of the present invention will appear on reading the following detailed description of an embodiment of the invention, provided by way of a non-limiting example and with reference to the appended drawings, wherein.

EMBODIMENTS OF THE INVENTION

Figure 1:
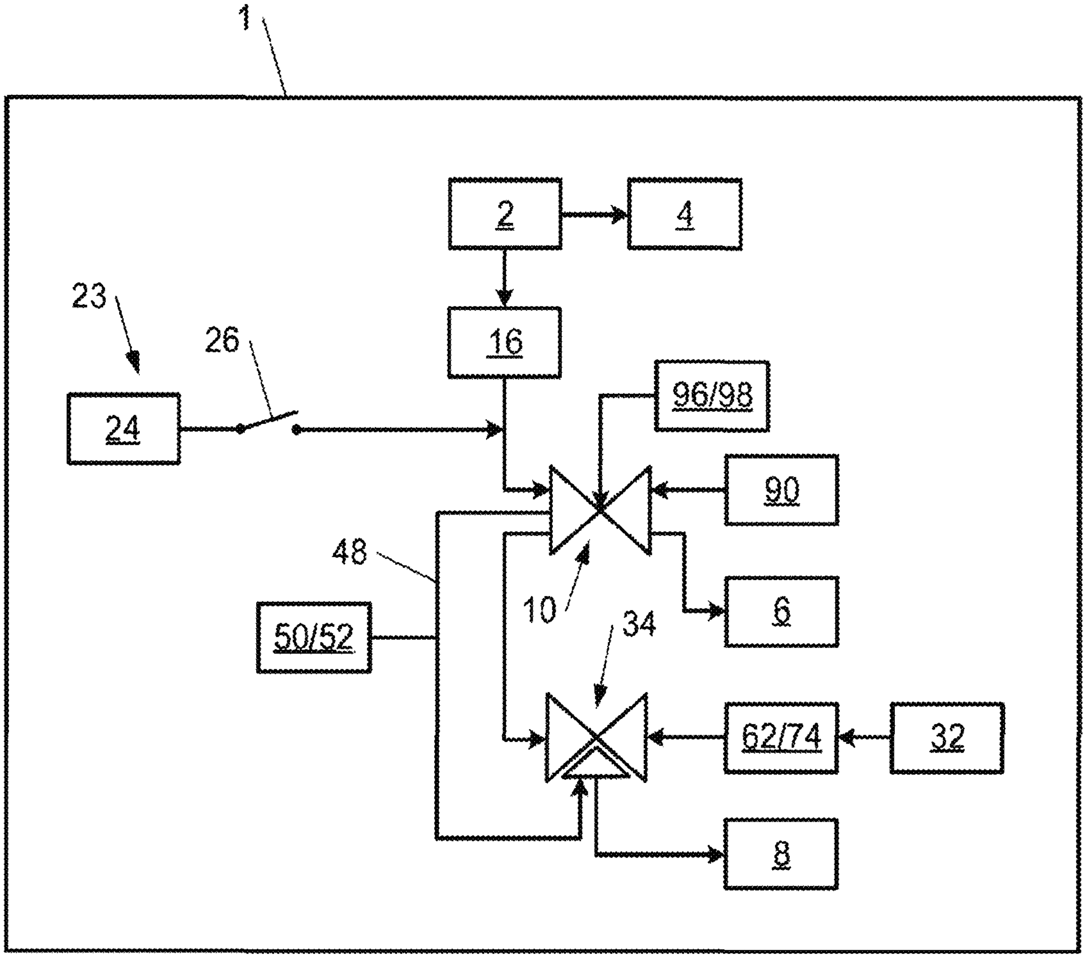
FIG. 1 is a simplified schematic diagram of the different mechanisms cooperating with the display members of a timepiece according to the invention.

FIG. 1 schematically depicts a timepiece 1 according to the invention, including a motor organ 2, such as a barrel, kinematically linked to a regulating member 4, such as a sprung balance. It is obvious that any other appropriate motor organ and any appropriate regulating member can be used.

The timepiece 1 also includes at least one first display member 6, such as a hand, arranged to display a local time HT, in cooperation with a minute display member (not depicted).

The timepiece 1 also includes a second display member 8, such as a hand, arranged to be able to display a GMT time of a different time zone from that of the local time HT.

It is obvious that any other appropriate member for displaying the local time HT and the GMT time can be used.

The timepiece also includes a drive wheel and pinion 10 of the first display member 6 arranged to be kinematically linked to the motor organ 2 in a disengageable manner.

Figure 3:
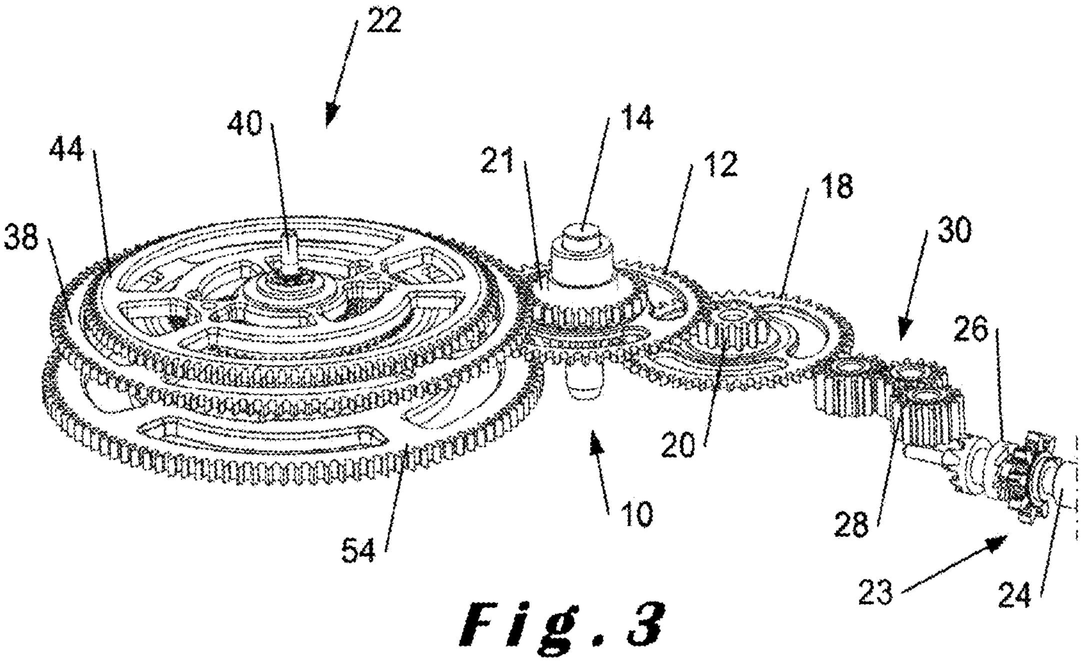
FIG. 3 is an isometric view, from the dial side, of the differential gear, of the drive wheel and pinion of the first display member and of the first correction mechanism.
Figure 5:
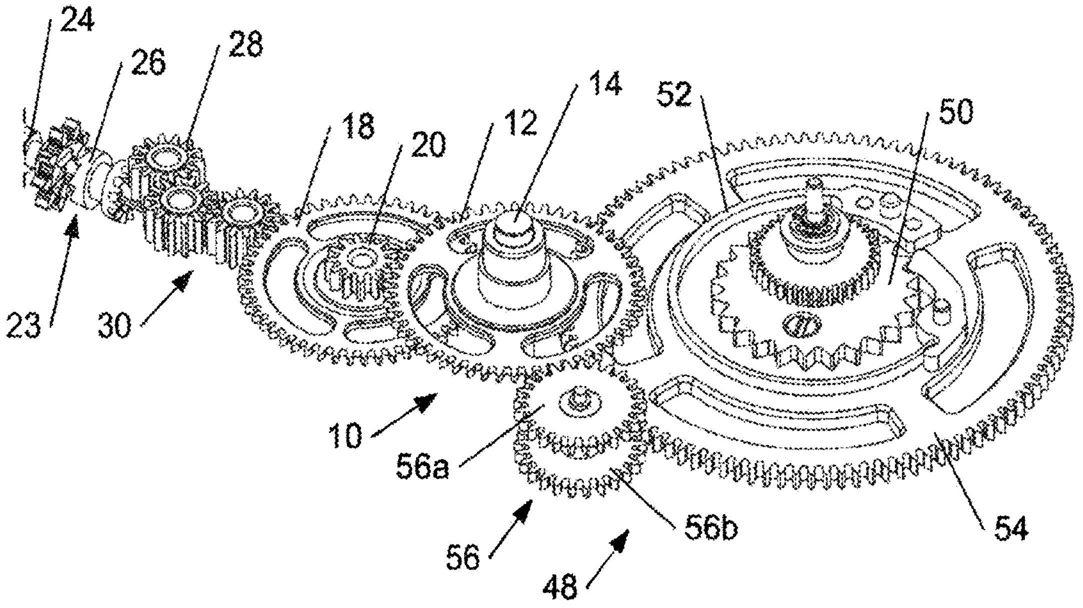
FIG. 5 is an isometric view, from the dial side, of the geartrain mounted in parallel and of its star/jumper system, of the drive wheel and pinion of the first display member and of the first correction mechanism.

Advantageously, and with reference to FIGS. 3 and 5, the drive wheel and pinion 10 includes an hour wheel 12 arranged to drive the first local time HT display member 6. The hour wheel 12 is carried in the known manner by the cannon-pinion 14 which, in an integral manner, carries the minute display member (such as a hand, not depicted), and which is kinematically linked to the motor organ 2 in a disengageable manner, for example, by means of friction 16. During the normal operation of the timepiece, the cannon-pinion 14 is driven via the motor organ 2 and, in turn, drives the hour wheel 12. To this end, the cannon-pinion 14 is arranged to cooperate with the minute wheel 18 and the hour wheel 12 is arranged to cooperate with the minute-pinion 20 which is integral with the minute wheel 18 in a traditional manner.

The drive wheel and pinion 10 also includes a drive pinion 21, which is integral with the hour wheel 12 and kinematically linked to a first input of a differential gear 22 which will be described in more detail below.

The timepiece 1 also includes a first correction mechanism 23 arranged to be able to be kinematically linked to the drive wheel and pinion 10 of the first local time HT display member 6 to allow simultaneous correction of the local time HT and the GMT time, preferably in a bidirectional manner. To this end, the hour wheel 12 is arranged to cooperate with the first correction mechanism 23.

Figure 2:
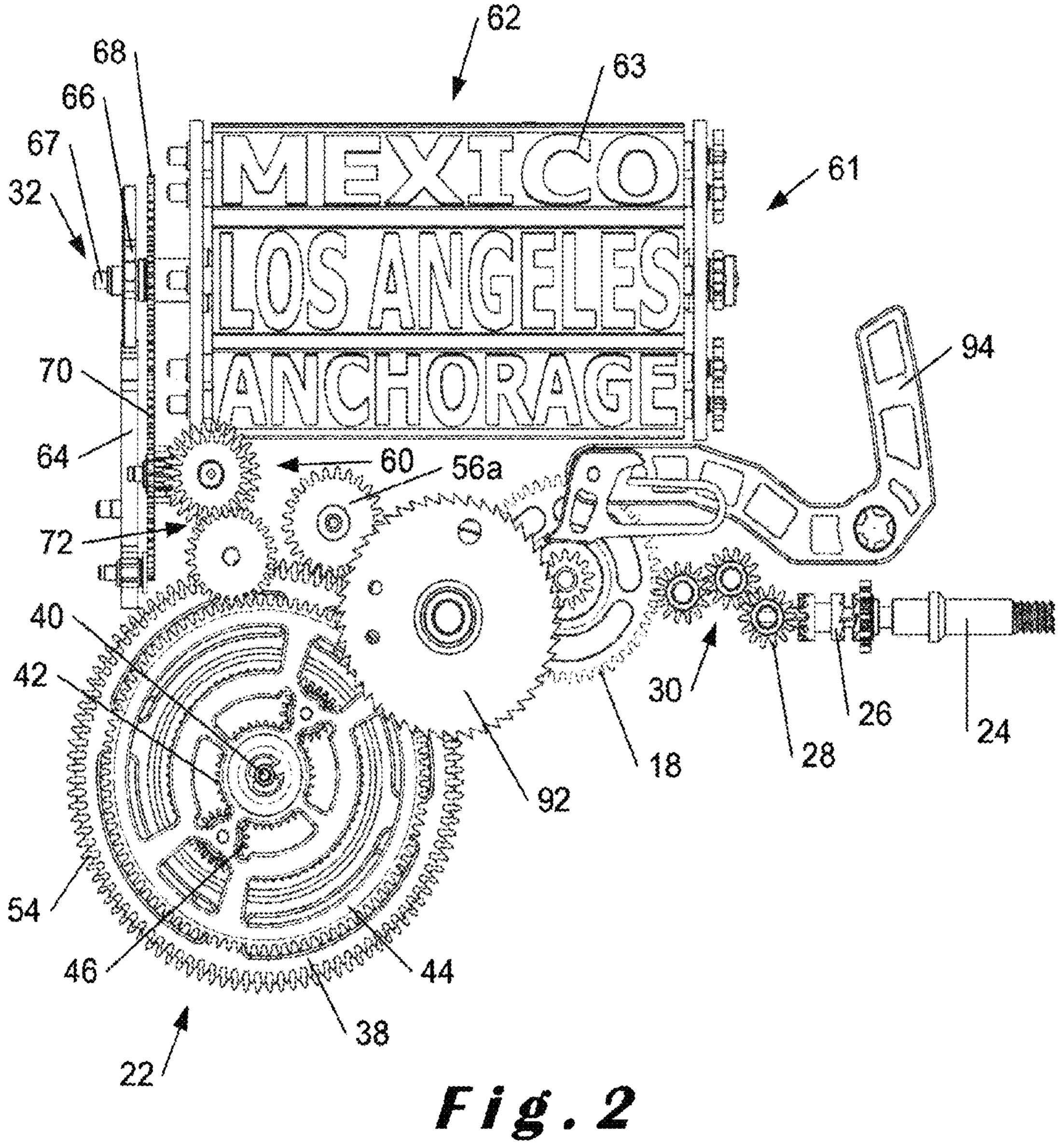
FIG. 2 is a plan view, from the dial side, of different mechanisms used in a timepiece according to the invention.

More particularly, and with reference to FIGS. 2, 3 and 5, the first correction mechanism 23 advantageously includes a hand-setting stem 24 arranged to be able to drive, preferably in a bidirectional manner, the drive wheel and pinion 10 of the first display member 6 during the simultaneous correction of the local time HT and the GMT time. To this end, and in the standard manner, the hand-setting stem 24 is the winding stem arranged to be able to occupy different successive distinct axial positions and, in particular, a hand-setting position allowing the simultaneous correction of the local time HT and the GMT time. In the standard manner, there is provided on the hand-setting stem 24 a sliding pinion 26 mounted slidingly on the stem 24 in order to be able to mesh with a first intermediate wheel 28, mounted freely in rotation on the frame of the piece, when the hand-setting stem 24 is in its hand-setting position. Other intermediate wheels 30 are provided between the first intermediate wheel 28 and the minute wheel 18 in order to drive the cannon-pinion 14 and the hour wheel 12 via the minute-pinion 20 in order to carry out the hand-setting by rotation of the stem 24.

This correction/hand-setting mechanism is known to the person skilled in the art and does not need to be described in more detail.

The, preferably bidirectional, rotation of the stem 24 drives the, preferably bidirectional, movement of the minute display member and of the first local time HT display member 6, but also the, preferably bidirectional, movement of the second GMT time display member 8, as will be described below, for the simultaneous hand-setting/correction of the local time HT and the GMT time.

It is obvious that the winding stem 24 can be replaced by any other appropriate correction stem.

The timepiece 1 also includes a second correction mechanism 32 of the second display member 8, distinct from the first correction mechanism, and arranged to be able to correct the GMT time independently of the local time HT.

The second correction mechanism 32 will be described in more detail below.

The timepiece 1 also includes a drive mechanism 34 of the second display member 8 including the differential gear 22.

Figure 4:
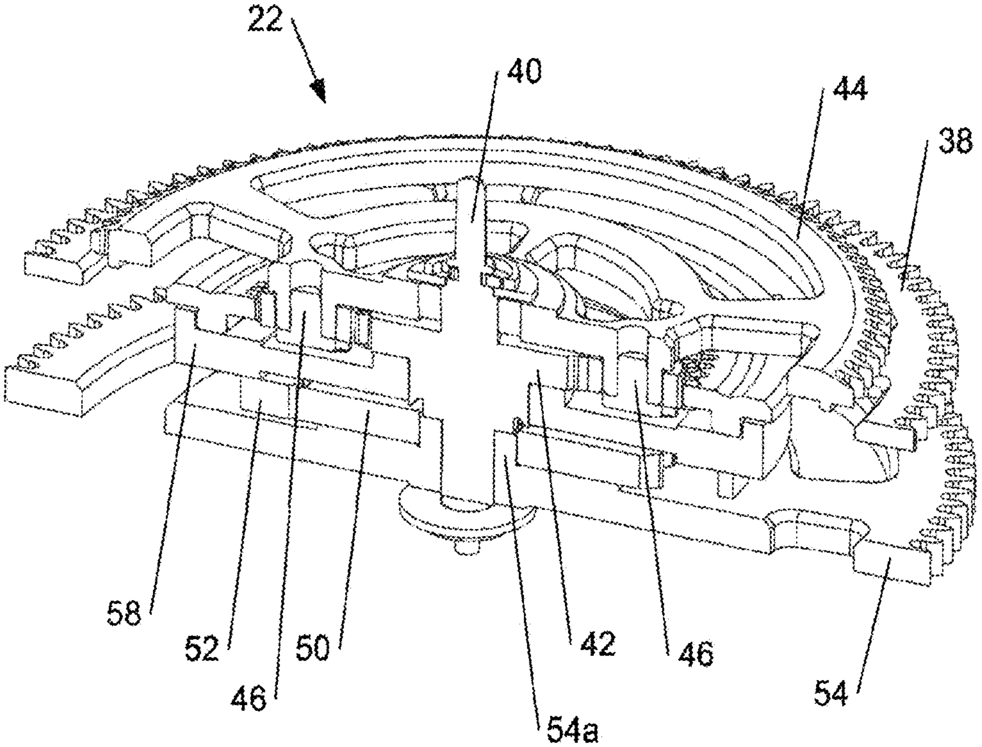
FIG. 4 is an isometric sectional view of the differential gear and of the additional wheel.

With reference more particularly to FIG. 4, said differential gear 22 includes a first sun wheel 38 constituting the first input arranged to be kinematically linked to the drive wheel and pinion 10 of the first local time HT display member 6 by the intermediary of its outer toothing which meshes with the drive pinion 21. The first sun wheel 38 is mounted freely in rotation on an axis 40 pivotably mounted on the frame of the piece and which constitutes the output of the differential gear 22, arranged to drive the second display member 8. To this end, the axis 40 can directly carry said second display member 8 in an integral manner or can include an intermediate wheel arranged to cooperate with said second display member 8.

The axis 40 carries a sun pinion 42 in an integral manner.

The differential gear 22 also includes a second planetary wheel carrier 44 constituting the second input arranged to be kinematically linked to the second correction mechanism 32 of the second display member 8.

The planetary wheel carrier 44 is mounted freely in rotation coaxially with the axis 40 and with the sun wheel 38. It carries at least one planetary pinion 46, here two planetary pinions 46 disposed symmetrically with respect to the axis 40 and mounted freely in rotation on the planetary wheel carrier 44. Each planetary pinion 46 is arranged to mesh both with the inner toothing of the sun wheel 38 and with the sun pinion 42.

In the known manner, the arrangement of the differential gear 22 allows, by the first input, the drive, by the motor organ 2, of the first local time HT display member 6, with the minute display member, and of the second GMT time display member 8, as well as the simultaneous correction by the first correction mechanism 23 of the first local time HT display member 6, with the minute display member, and of the second GMT time display member 8, and by the second input, the correction of the second GMT time display member 8 independently of the first local time HT display member 6.

In accordance with the present invention, the timepiece 1 includes a geartrain mounted in parallel 48 with the drive mechanism 34 of the second display member 8 and arranged to be kinematically linked to the drive wheel and pinion 10 of the first display member 6 and to be kinematically linked to the output of the differential gear 22 in a disengageable manner by means of a first star 50 linked to said geartrain mounted in parallel 48 and of a first jumper 52 connected to the output of the differential gear 22 and cooperating with said first star 50 such that said output is driven by said geartrain mounted in parallel 48 during a simultaneous correction of the local time HT and the GMT time by the first correction mechanism 23 and such that said output is uncoupled from said geartrain mounted in parallel 48 in order to allow the disengaging of said output, during a correction of the GMT time independently of the local time HT by the second correction mechanism 32, while allowing, after one or other of the corrections, a repositioning of the second display member 8 synchronized with the positioning of the first display member 6.

The geartrain mounted in parallel 48 advantageously includes an additional wheel 54 mounted freely in rotation coaxially with the axis 40 of the differential gear 22, as shown by FIG. 4. The additional wheel 54 advantageously has a pipe 54*a* in which the axis 40 turns, ensuring that said axis is retained better.

The additional wheel 54 is arranged to be kinematically linked to the drive wheel and pinion 10 of the first display member 6 and, more particularly, to the hour wheel 12 which is arranged to cooperate with said geartrain mounted in parallel 48. To this end, there is provided an intermediate wheel 56 which is made up of two staged pinions 56*a*, 56*b*, which are integral with one another, the pinion 56*a* being arranged to cooperate with the hour wheel 12 of the drive wheel and pinion 10 and the pinion 56*b* being arranged to cooperate with the additional wheel 54 of the geartrain mounted in parallel 48, as shown in FIG. 5.

Figure 6:
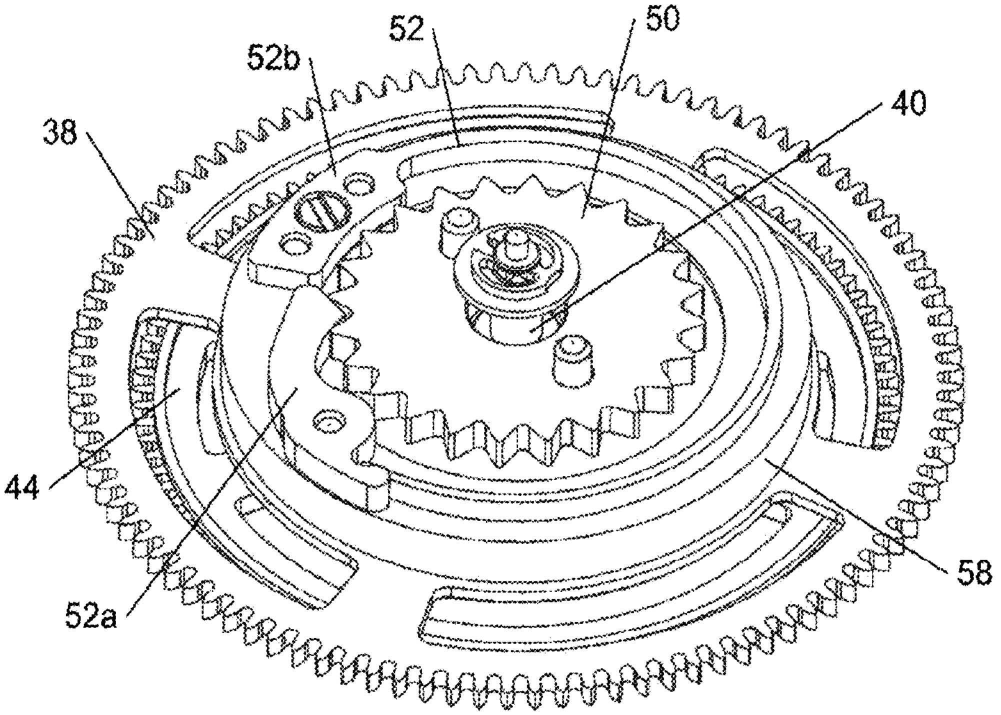
FIG. 6 is an isometric view, from the back side, of the differential gear and of the star/jumper system, the additional wheel having been removed.

With reference to FIG. 4, the additional wheel 54 carries, in an integral manner, the first star 50. As regards the first jumper 52, it is mounted on a plate 58 coaxially with the additional wheel 54 and integral with the axis 40 constituting the output of the differential gear 22. More particularly, the first jumper 52 includes a first end 52*a* pivotably mounted on the plate 58, its pivot axis being mounted in an integral manner on the plate 58, said first end 52*a* cooperating with the first star 50, and a second end 52*b* mounted in an integral manner on said plate 58, as shown by FIG. 6, in which the additional wheel is not depicted.

Thus, the first jumper 52 is arranged to connect the additional wheel 54 to the output of the differential gear 22 in a disengageable manner by means of the star 50 such that said output is uncoupled from said additional wheel 54 during a correction of the GMT time independently of the local time HT by the second correction mechanism 32.

The geartrain mounted in parallel 48 is advantageously arranged to be able to drive the output of the differential gear 22 at the same speed as the first input of the differential gear 22 drives said output when said geartrain 48 and the output are coupled or engaged by the star 50/jumper 52 link, that is to say during the drive by the motor organ 2 of the first local time HT display member 6 and of the second GMT time display member 8 as well as during the simultaneous correction by the first correction mechanism 23 of the first local time HT display member 6 and of the second GMT time display member 8.

Figure 7:
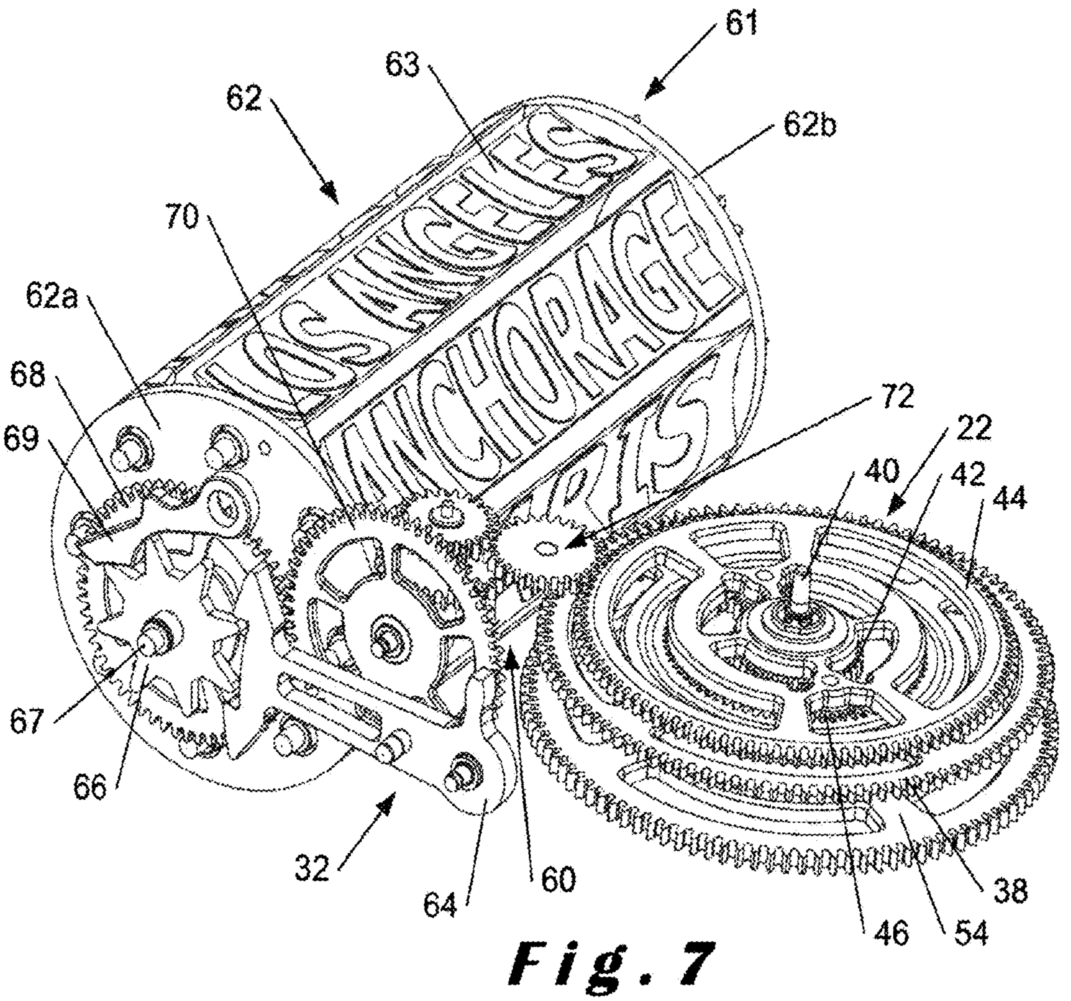
FIG. 7 is an isometric view, from the dial side, of the device for displaying places, of the differential gear and of the second correction mechanism.

Advantageously, and with reference to FIGS. 2 and 7, the second correction mechanism 32 includes, in particular, a correction geartrain 60 cooperating with the planetary wheel carrier 44 constituting the second input of the differential gear 22. Said correction geartrain is particularly advantageously arranged to allow a correction preferably in steps of the second GMT time display member 8, independently of the local time HT, that is to say independently of the first local time HT display member 6 and of the minute display member.

In the variant depicted in FIGS. 2 to 8, the timepiece includes a first display device 61 arranged to display places linked to the different time zones. Said first device for displaying places 61 is advantageously of the roller display device type arranged to display cities which are representative of the different time zones.

For example, said first device for displaying places 61 includes a main drum 62 which carries between its two cheeks 62*a*, 62*b* eight triangular prismatic elements 63 which are mounted freely in rotation around their respective longitudinal axes. On each of the three faces of each element 63 there is inscribed a place corresponding to a time zone in order to be able to display the 24 time zones with all of the eight elements 63. Each prismatic element 63 carries at one end a toothed wheel 63*a* arranged to cooperate with a fixed finger (not depicted) so as to make each element 63 advance by ⅓ turn for one rotation of the main drum 62. Three rotations of the main drum 63 are therefore necessary to display the 24 cities corresponding to the 24 time zones. The cities are distributed on the different faces of the elements 63 so that they are displayed in the order of the time zones.

As shown in FIGS. 2 and 7, the first display device 61 is provided on the kinematic chain between the second correction mechanism 32 and the planetary wheel carrier 44 constituting the second input of the differential gear 22 in order to allow a correction of the place displayed by the first display device 61 during a correction of the second GMT time display member 8 linked to said place by means of the second correction mechanism 32, independently of the local time HT.

The second correction mechanism 32 is advantageously arranged to carry out a step-by-step correction. To this end, the second correction mechanism 32 includes, for example, two correctors such as pushers (not depicted) arranged to be actuated by a user in order to actuate respectively in one direction or another a control 64 having two arms cooperating with an eight-pointed star 66 mounted in an integral manner on one of the ends of the arbor 67 of the main drum 62. The control 64 is arranged to make the star 66 advance by one step in one direction or another, depending on the corrector used. Thus, with each correction on demand by applying pressure to a corrector, the star 66 advances by ⅛ of a turn, driving the main drum 63 by ⅛ of a turn in order to display one face of the next element 63, while the element 63 which passes in front of the fixed finger advances by ⅓ of a turn. The correction is continued until the face of the element 63 corresponding to the selected city appears.

The correction geartrain 60 of the second correction mechanism 32 includes a first wheel 68 which is integral with the arbor 67 of the main drum 62, a second wheel 70 meshing, on the one hand, with the first wheel 68 and, on the other hand, with different intermediate wheels 72 mounted on the frame, the last of which meshes with the planetary wheel carrier 44.

It is obvious that the push-piece could be replaced by a correction stem arranged to have an angle of rotation which is preferably controlled in order to control the angle of rotation of the planetary wheel carrier 44 and therefore of the second display member 8 during its correction alone.

The bidirectional correction obtained with two correctors in order to actuate the control 64 advantageously makes it possible to correct the place and the second display member 8 in one direction or another.

It is of course possible to only use a single corrector such that the correction will then be unidirectional.

Figure 9:
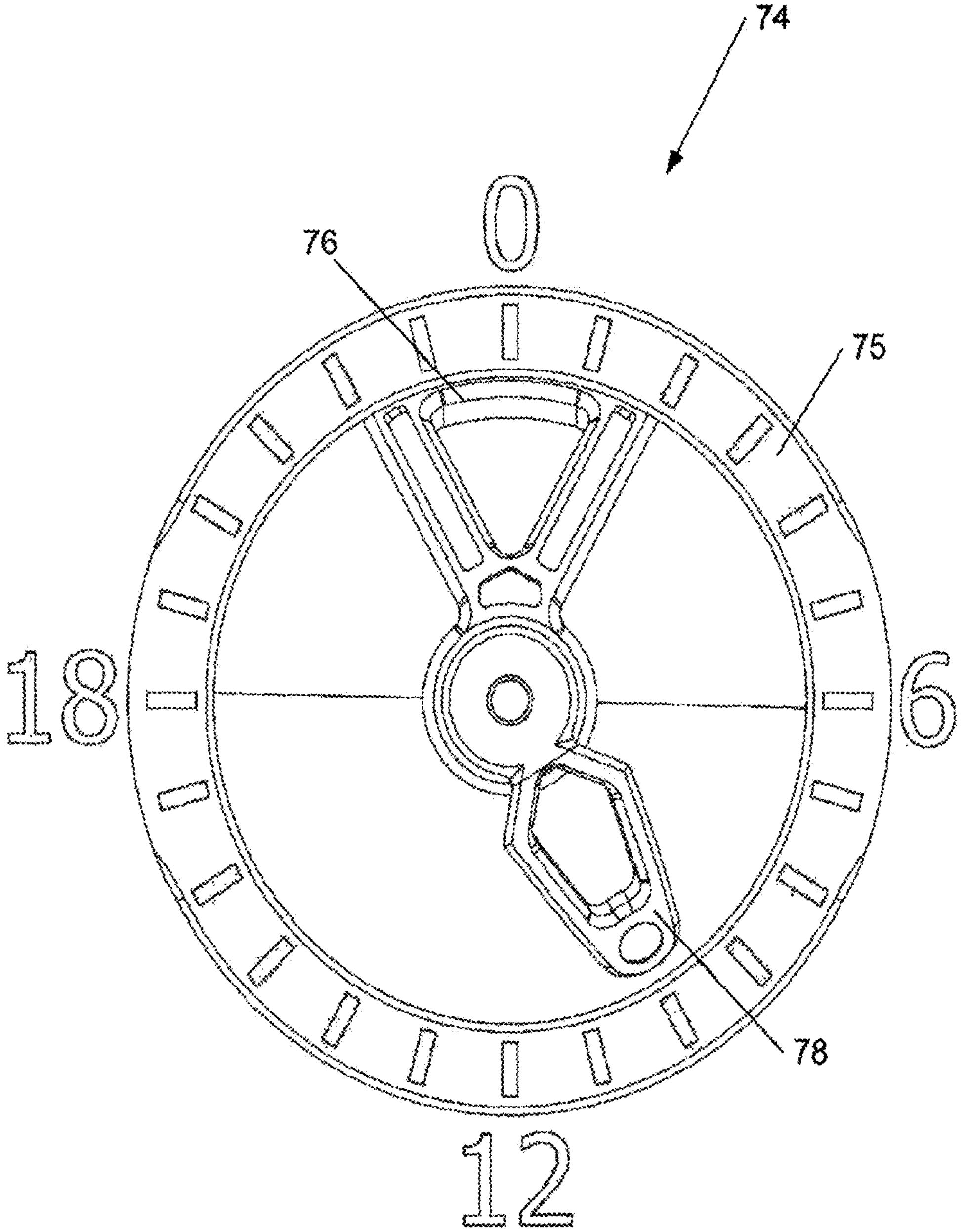
FIG. 9 is a view of a display device arranged to display the difference between the local time HT and the GMT time and cooperating with the differential gear, used in a variant of the invention.

In a variant of the invention, the first device 61 for displaying cities representative of the different time zones can be replaced by a second display device 74 as depicted in FIG. 9, arranged to directly and immediately display the difference between the local time HT, displayed by the first display member 6, and the GMT time, displayed by the second display member 8.

The second display device 74 includes a fixed dial 75 graduated from 0 to 24, an indicator 76 mounted in a fixed manner on the dial 75 in the form of, for example, a fixed circular sector positioned around the 0 serving to define the local time HT as a reference point (HT=0), as well as a third display member 78, such as a hand, which is mounted in a rotationally movable manner with respect to the dial 75. The position of the third display member 78 on the dial 75 with respect to the fixed indicator 76 indicates the difference or the time difference value between the local time HT (0) and the GMT time chosen, for example, a time difference of +10 h between the GMT time and the local time HT, as depicted here in FIG. 9.

Thus, the second display device 74 makes it possible to indicate directly to the user the difference of 0 to 24 hours between two time zones among the 24 possible time zones.

According to another variant which is not depicted, the fixed dial 75 can be graduated, not from 0 to 24, but from 0 to-12 on one side of the 0 indicated by the fixed indicator 76 and from 0 to +12 on the other side of the 0, making it possible to indicate directly to the user the time difference of 0 to 12 hours in one direction or the other by means of the third display member 78.

As in the case of the first display device, the second display device 74 is provided on the kinematic chain between the second correction mechanism 32 and the planetary wheel carrier 44 constituting the second input of the differential gear 22 in order to allow a correction of the difference between the local time HT and the GMT time displayed by the third display member 78, during a correction of the second GMT time display member 8 by means of the second correction mechanism 32, independently of the local time HT.

To this end, the third display member 78 is kinematically linked to the second correction mechanism 32 and to the second input of the differential gear 22. More specifically, the second correction mechanism 32 includes a control arranged to make the third display member 78 turn in one direction or another depending on the time difference to be displayed, and a correction geartrain kinematically linking the third display member 78 to the second input of the differential gear 22, said correction geartrain including a first wheel meshing with the third display member 78 and a last wheel meshing with the planetary wheel carrier 44, like the correction geartrain 60.

It is obvious that the first device for displaying places 61 or the second time difference display device 74 cannot be present. In this case, the second correction mechanism 32 is arranged so that the cooperation between the corrector and the planetary wheel carrier 44 takes place solely via the correction geartrain 60.

The timepiece 1 advantageously includes a third correction mechanism 90 of the first local time HT display member 6 distinct from the first and second correction mechanisms and arranged to be able to cooperate with said first local time HT display member 6 in order to be able to solely drive said first local time HT display member 6 during a correction of the local time HT, that is to say without the minute display member, the first display member 6 then being uncoupled from the rest of the drive wheel and pinion 10 and from the drive mechanism 34 of the second GMT time display member 8.

The third correction mechanism 90 is preferably arranged to carry out a step-by-step correction of the first display member 6 alone, in order to guarantee, after its correction, a repositioning synchronized with the minute display member and with the second display member 8.

Figure 8:
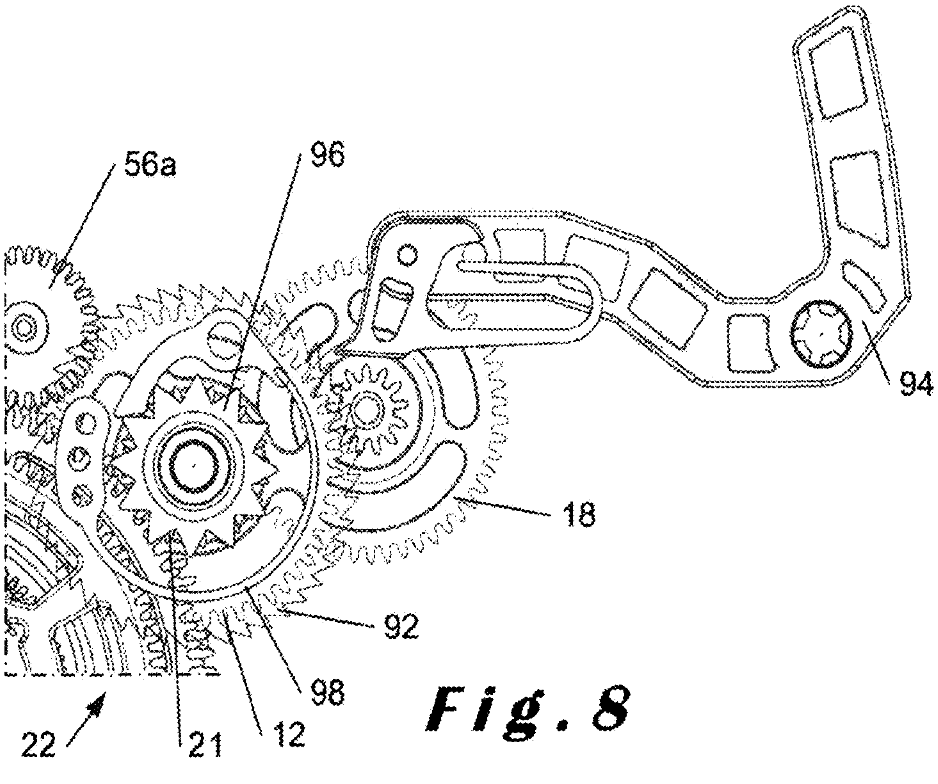
FIG. 8 is a plan view, from the dial side, of the third correction mechanism.

To this end, and with reference to FIGS. 2 and 8, the third correction mechanism 90 of the first display member 6 includes a sawtooth correction wheel 92 mounted in a rotationally movable manner on the pipe of the hour wheel 12 and carrying the first display member 6 in an integral manner. The correction wheel 92 is linked to the hour wheel 12 in a disengageable manner.

The third correction mechanism 90 of the first display member 6 also includes a correcting finger 94 which can be actuated by a user, and arranged to actuate the correction wheel 92 by disengaging it from the rest of the drive wheel and pinion 10, so as to solely drive the first display member 6 for a step-by-step correction, independently of the minute display member and of the second display member 8.

More particularly, the hour wheel 12 carries a second star 96 in an integral manner, and the correction wheel 92 carries, in an integral manner, a second jumper 98 cooperating with said second star 94 and arranged to connect the hour wheel 12 to said correction wheel 92 in a disengageable manner. Thus, said correction wheel 92 is uncoupled from said hour wheel 12 during a correction of the first local time HT display member 6 by the correcting finger 94 so that only the first display member 6 is moved for its operation.

The different mechanisms operate as follows during the normal operation of the timepiece: the motor organ 2 drives the cannon-pinion 14 which, in turn, drives the minute display member as well as the hour wheel 12, via the minute wheel 18 and the minute-pinion 20. The hour wheel 12 drives the first local time HT display member 6 via the correction wheel 92 coupled to the hour wheel 12 by the star 96/jumper 98 assembly.

The drive pinion 21 which is integral with the hour wheel 12 is also driven and, in turn, drives the sun wheel 38 of the differential gear 22. Since the planetary wheel carrier 44 is blocked by the first device for displaying places 61, and the star 66 is retained by its jumper 69, the planetary pinions 46 constitute simple intermediate wheels. The sun wheel 38 meshes with the planetary pinions 46 which mesh with the sun pinion 42 so as to drive the axis 40, the rotation of the axis 40 driving the rotation of the second display member 8 in order to display the GMT time, without driving the main drum 62.

In parallel, the hour wheel 12 meshes with the pinion 56*a*, and therefore the pinion 56*b* of the intermediate wheel 56, said pinion 56*b* meshing with the additional wheel 54 of the geartrain mounted in parallel 48. The latter is coupled to the axis 40 via the star 50/jumper 52 assembly so that the axis 40 is also driven by the additional wheel 54, at the same speed as the driving speed via the sun wheel 38.

The geartrain mounted in parallel 48 makes it possible to reduce the play due to the differential gear 22 solely to the play linked to said geartrain mounted in parallel 48. The play of such a geartrain including simply the intermediate wheel 56 linked to the additional wheel 54 is much less than the play linked to the differential gear 22. In addition, the behavior of the axis 40 is reinforced on account of the link to the additional wheel 54 via the star 50/jumper 52 assembly. Thus, during the normal operation of the piece, the position of the second GMT time display member 8 remains perfectly synchronized with the position of the first local time HT display member 6 with respect to the position of the minute display member, the play of the geartrain mounted in parallel which comes into play between the local time HT and the GMT time being greatly reduced.

The dimensions and the number of teeth of the different gears are chosen to have a GMT time display over 24 hours, for example. It is obvious that the GMT time can also be displayed over 12 hours, the dimensions and the number of teeth of the different gears being adapted accordingly.

During the simultaneous correction of the local time HT and the GMT time, the user actuates the winding stem 24 which is moved into its hand-setting position in order to engage the sliding pinion 26 with the first intermediate wheel 28. The cannon-pinion is uncoupled from the motor organ 2 by the friction 16. During the rotation of the stem 24, the first intermediate wheel 28 driven by the sliding pinion 26 drives the other intermediate wheels 30, then the minute wheel 18 and the minute-pinion which, in turn, drive the cannon-pinion and the hour wheel 12 respectively in order to carry out the hand-setting of the local time HT, by moving the HT time and minute display members. As described above, the drive pinion 21 which is integral with the hour wheel 12 meshes with the sun wheel 38 of the differential gear 22 and, in parallel, the hour wheel 12 meshes with the geartrain mounted in parallel 48 so as to drive the rotation of the axis 40 and therefore the rotation of the second display member 8 for its correction, without driving the main drum 62. As described above, the play generated by the geartrain mounted in parallel 48 is much less than the play generated by the differential gear 22. In addition, the use of the stem 24 allows a bidirectional correction of the HT time and the GMT time. Thus, during a hand-setting or a simultaneous and bidirectional correction of the local time HT and the GMT time, the position of the second GMT time display member 8 remains perfectly synchronized with the position of the first local time HT display member 6 with respect to the position of the minute display member, the play of the geartrain mounted in parallel which comes into play between the local time HT and the GMT time being greatly reduced.

During the correction of the GMT time and the place, when the first device for displaying places 61 is present, the user actuates one of the correctors of the second correction mechanism 32 by applying successive pressure in order to actuate the main drum 62 and its elements 63 until the desired place is displayed. In parallel, the correction geartrain 60 is driven so as to drive the planetary wheel carrier 44 of the differential gear 22. On account of the differential gear used, the sun wheel 38 is considered to be stationary with respect to the correction speed so that the planetary pinions 46, carried by the planetary wheel carrier 44, slide, on the one hand, on the inner toothing of the sun wheel 38 and, on the other hand, drive the axis 40, and therefore the second member display 8, by meshing with the sun pinion 42. It is also considered that the additional wheel 54 is stationary with respect to the correction speed so that the axis 40 disconnects from the additional wheel 54, the jumper 52 no longer cooperating with the star 50, and jumping one tooth of the star 50.

The elements 63 of the main drum 62 and the second GMT time display member are corrected simultaneously, independently of the first local time HT display member 6 and of the minute display member, on account of the differential gear 22, the star 50/jumper 52 assembly linked to the axis 40 of said differential gear 22 allowing said axis 40 to reposition itself precisely with respect to the position of the first display member 6 after each correction of the second GMT time display member 8, the jumper 52 jumping one tooth of the star 50 in order to reposition itself precisely between the following teeth so that the position of said second GMT time display member 8 remains perfectly synchronized with the position of the first local time HT display member 6 with respect to the position of the minute display member.

In addition, the use of a step-by-step corrector makes it possible to precisely control the angles of rotation of the various geartrains during the correction of the GMT time and the place so as to reinforce the precision of the repositioning of the axis 40 and therefore of the second GMT time display member 8 after its correction.

Similarly, during the correction of the difference between the local time HT and the GMT time when the second display device 74 is present, bringing about a correction of the GMT time alone, the user actuates the second correction mechanism 32 in order to move the third display member 78 until the desired time difference is displayed on the dial 75.

In parallel, the correction geartrain of the second correction mechanism 32 is driven so as to drive the planetary wheel carrier 44 of the differential gear 22, driving the axis 40, and therefore the second GMT time display member 8. As described above, the third display member 78 and the second GMT time display member 8 are corrected simultaneously, independently of the first local time HT display member 6 and the minute display member, on account of the differential gear 22, the star 50/jumper 52 assembly linked to the axis 40 of said differential gear 22 allowing the axis 40 to reposition itself precisely with respect to the position of the first display member 6 after each correction of the third member 78 for displaying the difference between the local time HT and the GMT time and of the second GMT time display member 8.

During the correction of the first HT time display member 6 alone, for example during a first adjustment following the purchase of the watch or during the transition from summer time to winter time (which can take place on different dates according to the time zones), the user actuates the correcting finger 94 so as to disconnect the correction wheel 92 from the rest of the drive wheel and pinion 10, the jumper 98 no longer cooperating with the star 96. The step-by-step correction of the correction wheel 92 which is integral with the first display member 6 makes it possible to advance solely said first display member 6 in steps of 1 hour, without driving the minute display member, or the second GMT time display member 8. Thus, the position of the first local time HT display member 6 remains perfectly synchronized with the position of the second GMT time display member 8 with respect to the position of the minute display member.

Thus, the timepiece according to the invention makes it possible to simultaneously correct places and the GMT time without correcting the local time HT, to set the hands or simultaneously and bidirectionally correct the local time HT and the GMT time without correcting the place displayed, and to solely correct the local time HT display member 6, which makes it possible, after one or other of these corrections, to guarantee a positioning of the second GMT time display member which is permanently synchronized with the positioning of the first HT display member with respect to the position of the minutes display member.

The invention claimed is:

1. A timepiece comprising:

a motor organ;

at least one first display member configured to display a local time of a time zone;

a second display member configured to be able to display another time of a different time zone from that the time zone of the local time;

a drive wheel and pinion of the at least one first display member, the drive wheel and pinion configured to be kinematically linked to the motor organ in a disengageable manner;

a first correction mechanism configured to be kinematically linked to the drive wheel and pinion of the at least one first display member to allow simultaneous correction of the local time and the other time;

a second correction mechanism of the second display member, distinct from the first correction mechanism, the second correction mechanism being configured to correct the other time independently of the local time;

a drive mechanism of the second display member including a differential gear comprising at least one first input configured to be kinematically linked to the drive wheel and pinion of the first display member, a second input configured to be kinematically linked to the second correction mechanism of the second display member, and an output configured to drive said second display member; and a geartrain mounted in parallel with the drive mechanism of the second display member and configured to be kinematically linked to the drive wheel and pinion of the first display member and to be kinematically linked to the output of the differential gear in a disengageable manner by a first star linked to said geartrain mounted in parallel and a first jumper connected to the output of the differential gear and cooperating with said first star such that said output is driven by said geartrain mounted in parallel during a simultaneous correction of the local time and the other time by the first correction mechanism and such that said output is uncoupled from said geartrain mounted in parallel during a correction of the other time independently of the local time by the second correction mechanism while allowing, after correction, a repositioning of the second display member synchronized with positioning of the first display member.

2. The timepiece according to claim 1, wherein said geartrain mounted in parallel includes an additional wheel mounted freely in rotation coaxially with the differential gear and configured to be kinematically linked to the drive wheel and pinion of the first display member, said additional wheel carrying said first star, said first jumper being configured to connect said additional wheel to the output of the differential gear such that said output is uncoupled from said additional wheel during a correction of the other time independently of the local time by the second correction mechanism.

3. The timepiece according to claim 2, wherein said first jumper includes a first end pivotably mounted on a plate which is coaxial with the additional wheel and integral with the output of the differential gear, said first end cooperating with the first star, and a second end which is integral with said plate.

4. The timepiece according to claim 2, wherein the drive wheel and pinion of the first display member includes an hour wheel configured to be kinematically linked to the motor organ in a disengageable manner and to drive the first display member, said hour wheel being configured to cooperate with the first correction mechanism and the geartrain mounted in parallel and a drive pinion kinematically linked to the first input of the differential gear, and the timepiece further comprises an intermediate wheel configured to cooperate with the hour wheel of the drive wheel and pinion of the first display member and the additional wheel of the geartrain mounted in parallel.

5. The timepiece according to claim 2, wherein said geartrain mounted in parallel is configured to drive the output of the differential gear, when the geartrain and the differential gear are coupled, at a same speed as a speed that the first input of the differential gear drives said output.

6. The timepiece according to claim 2, wherein the drive wheel and pinion of the first display member includes an hour wheel configured to be kinematically linked to the motor organ in a disengageable manner and to drive the first display member, said hour wheel being configured to cooperate with the first correction mechanism and the geartrain mounted in parallel and a drive pinion kinematically linked to the first input of the differential gear.

7. The timepiece according to claim 2, wherein the differential gear includes a sun wheel, constituting the first input, mounted freely in rotation on an axis, constituting the output of the differential gear, carrying a sun pinion, and a planetary wheel carrier, constituting the second input, carrying at least one planetary pinion meshing both with the sun wheel and the sun pinion.

8. The timepiece according to claim 1, wherein said geartrain mounted in parallel is configured to drive the output of the differential gear, when the geartrain and the differential gear are coupled, at a same speed as a speed that the first input of the differential gear drives said output.

9. The timepiece according to claim 1, wherein the drive wheel and pinion of the first display member includes an hour wheel configured to be kinematically linked to the motor organ in a disengageable manner and to drive the first display member, said hour wheel being configured to cooperate with the first correction mechanism and the geartrain mounted in parallel and a drive pinion kinematically linked to the first input of the differential gear.

10. The timepiece according to claim 1 wherein the differential gear includes a sun wheel, constituting the first input, mounted freely in rotation on an axis, constituting the output of the differential gear, carrying a sun pinion, and a planetary wheel carrier, constituting the second input, carrying at least one planetary pinion meshing both with the first sun wheel and the sun pinion.

11. The timepiece according to claim 1, wherein the first correction mechanism includes a hand-setting configured to drive the drive wheel and pinion of the first display member in a bidirectional manner during the simultaneous correction of the local time and the other time.

12. The timepiece according to claim 1, wherein the second correction mechanism includes a correction geartrain cooperating with the second input of the differential gear and configured to allow a step-by-step correction of the second display member independently of the local time.

13. The timepiece according to claim 1, further comprising a first display device configured to display places linked to the different time zones, said first display device being provided on a kinematic chain between the second correction mechanism and the second input of the differential gear to allow a correction of one of the places displayed during a correction of the second display member linked to said one place, independently of the local time, by the second correction mechanism.

14. The timepiece according to claim 13, wherein the first display device is a roller display device configured to display cities.

15. The timepiece according to claim 13, further comprising a second display device configured to display a difference between the local time and the other time, said second display device being provided on the kinematic chain between the second correction mechanism and the second input of the differential gear to allow a correction of the difference between the local time and the other time displayed during a correction of the second display member, independently of the local time, by the second correction mechanism.

16. The timepiece according to claim 15, wherein the second display device includes a dial, an indicator which is mounted in a fixed manner on the dial and configured to define the local time HT as a reference point, and a third display member mounted in a rotationally movable manner with respect to said dial, a position of the third display member on the dial with respect to the indicator indicating the difference between the local time and the other time, said third display member being kinematically linked to the second correction mechanism and the second input of the differential gear.

17. The timepiece according to claim 1, further comprising a third correction mechanism of the first display member distinct from the first and second correction mechanisms and configured to cooperate with said first display member to solely drive said first display member during a correction of the local time.

18. The timepiece according to claim 17, wherein the drive wheel and pinion of the first display member includes an hour wheel configured to be kinematically linked to the motor organ in a disengageable manner and to drive the first display member, said hour wheel being configured to cooperate with the first correction mechanism and the geartrain mounted in parallel and a drive pinion kinematically linked to the first input of the differential gear, and the third correction mechanism of the first display member includes a correction wheel which is integral with the first display member and linked to the hour wheel in a disengageable manner, and a correcting finger configured to actuate said correction wheel by disengaging the correction wheel to solely drive the first display member for a step-by-step correction.

19. The timepiece according to claim 18, wherein the hour wheel carries a second star, and the correction wheel carries a second jumper cooperating with said second star and configured to connect the hour wheel to said correction wheel such that said correction wheel is uncoupled from said hour wheel during a correction of the first display member of the local time by the correcting finger.

* * * * *